US011293481B2

(12) United States Patent
Chen

(10) Patent No.: US 11,293,481 B2
(45) Date of Patent: Apr. 5, 2022

(54) ROTATION JOINT STRUCTURE WITH TWO-STAGE LOCK

(71) Applicant: Way-Hong Chen, Taipei (TW)

(72) Inventor: Way-Hong Chen, Taipei (TW)

( * ) Notice: Subject to any disclaimer, the term of this patent is extended or adjusted under 35 U.S.C. 154(b) by 80 days.

(21) Appl. No.: 16/934,160

(22) Filed: Jul. 21, 2020

(65) Prior Publication Data

US 2022/0025917 A1    Jan. 27, 2022

(51) Int. Cl.
*F16C 11/10* (2006.01)
*F16B 12/44* (2006.01)
*B62B 7/06* (2006.01)
*A47D 9/00* (2006.01)
*A47D 13/06* (2006.01)
*A47D 7/00* (2006.01)

(52) U.S. Cl.
CPC ............. *F16C 11/10* (2013.01); *A47D 7/002* (2013.01); *A47D 9/005* (2013.01); *A47D 13/061* (2013.01); *B62B 7/06* (2013.01); *F16B 12/44* (2013.01); *Y10T 403/32336* (2015.01); *Y10T 403/581* (2015.01)

(58) Field of Classification Search
CPC ...... A47D 7/002; A47D 9/005; A47D 13/061; B62B 7/06; B62B 9/12; F16B 2/16; F16B 2/18; F16B 7/044; F16B 7/048; F16B 12/44; F16B 12/46; F16B 12/50; F16C 11/10; F16C 11/103; Y10T 403/32319; Y10T 403/32327; Y10T 403/32336; Y10T 403/32361; Y10T 403/32401; Y10T 403/32442; Y10T 403/32451; Y10T 403/32467; Y10T 403/581; Y10T 403/583; Y10T 403/587; Y10T 403/604

USPC ....... 403/91, 92, 93, 96, 101, 106, 107, 108, 403/316, 317, 319, 328
See application file for complete search history.

(56) References Cited

U.S. PATENT DOCUMENTS

| 3,643,292 | A  | * | 2/1972  | Mayer  | F16C 11/10 16/325 |
| 4,474,264 | A  | * | 10/1984 | Krause | E06C 1/32 182/163 |
| 4,645,371 | A  | * | 2/1987  | Wang   | F16C 11/10 403/96 |
| 9,127,709 | B2 | * | 9/2015  | Shan   | F16C 11/10 |
| 10,479,390 | B2 | * | 11/2019 | Zhong  | F16B 12/06 |
| 2019/0162214 | A1 | * | 5/2019 | Chen   | F16C 11/10 |

FOREIGN PATENT DOCUMENTS

| CN | 110329334 A | * | 10/2019 | ............. B62B 7/083 |
| CN | 110481622 A | * | 11/2019 | ............... B62B 7/06 |

* cited by examiner

*Primary Examiner* — Josh Skroupa
(74) *Attorney, Agent, or Firm* — Karin L. Williams; Alan D. Kamrath; Mayer & Williams PC

(57) ABSTRACT

A rotation joint structure includes a fixed joint, a movable joint, a first limit member, and a second limit member. The fixed base has a locking groove. The movable joint is pivotally connected with the fixed joint. The movable joint has a first slideway and a second slideway connected to each other. The first limit member is movably mounted in the first slideway. The second limit member is movably mounted in the second slideway. When the second limit member is locked in the locking groove, and the first limit member stops the second limit member, the movable joint is locked and cannot be rotated. Thus, the movable joint is disposed at a two-stage locking state.

4 Claims, 9 Drawing Sheets

ROTATION JOINT STRUCTURE WITH TWO-STAGE LOCK

BACKGROUND OF THE INVENTION

1. Field of the Invention

The present invention relates to a joint and, more particularly, to a rotation joint structure.

2. Description of the Related Art

A conventional joint structure comprises a fixed joint and a movable joint pivotally connected with the fixed joint. The conventional joint structure is available for a household implement or utensil, such as a baby bed, a play pen, a baby stroller, a coat rack or the like. Thus, the movable joint is rotated relative to the fixed joint to expand or fold the conventional joint structure and the household implement. The conventional joint structure also comprises a locking mechanism to lock the movable joint so as to prevent the movable joint from being pivoted freely. However, the conventional joint structure only has a single locking mechanism so that the locking mechanism is easily unlocked and released due to an inadvertent touch. Thus, the conventional joint structure cannot be used safely.

BRIEF SUMMARY OF THE INVENTION

The primary objective of the present invention is to provide a rotation joint structure that provides a two-stage locking mechanism to ensure a safe usage.

In accordance with the present invention, there is provided a rotation joint structure comprising a fixed joint, a movable joint, at least one primary spring, a slide knob, a first limit member, a second limit member, a secondary spring, and a movable rod. The fixed joint has a fixed base. The fixed base has a face provided with at least one primary receiving slot. The fixed base has an outside provided with a locking groove. The movable joint has a movable seat. The movable seat has a face formed with at least one resting portion, a first slideway, and a second slideway. The at least one resting portion protrudes from the movable seat. The first slideway is connected to the second slideway. The second slideway has an interior formed with a protruding block. The movable seat has an outside formed with an opening and a mounting portion. The opening is connected to the first slideway. The mounting portion extends outward from the outside of the movable seat and defines a mounting recess. The mounting recess linearly aligns with the second slideway and is connected to the second slideway. The movable seat is pivotally connected with the fixed base. The at least one resting portion extends into the at least one primary receiving slot. The at least one primary spring is mounted in the at least one primary receiving slot and has a first end pressing one end of the at least one primary receiving slot and a second end pressing the at least one resting portion. The slide knob has a knob body. The knob body has a side formed with an insert. The slide knob is mounted in the opening such that the knob body is exposed outward from the movable seat. The insert extends through the opening into the first slideway. The first limit member has a first limit body. The first limit body has a side formed with an insert slot. The first limit body has an end formed with a stop block. The first limit member is mounted in the first slideway. The insert is inserted into the insert slot. The second limit member has a second limit body. The second limit body has a first side formed with a locking block and a second side formed with a protruding wall. The protruding wall defines a secondary receiving slot. The second limit member is mounted in the second slideway. The locking block is located outside of the second slideway. The protruding wall is received in the second slideway. The secondary spring is mounted in the secondary receiving slot. The secondary spring has a first end pressing the protruding block and a second end pressing one end of the secondary receiving slot. The movable rod is mounted in the mounting recess. The movable rod has an end secured to the second limit body of the second limit member.

When the rotation joint structure is disposed at a locked state, the at least one primary spring is extended normally, and the movable joint is pressed by the at least one primary spring such that the second slideway corresponds to the locking groove. At this time, the secondary spring is also extended normally to push the second limit member such that the locking block is locked in the locking groove. Thus, the movable joint is locked and cannot be rotated. In addition, the slide knob is located at a position where the stop block of the first limit member extends into the second slideway and rests on the protruding wall of the second limit member to stop movement of the second limit member, such that the second limit member is locked, and the movable rod cannot be pulled outward, to prevent the locking block from being detached from the locking groove. Thus, the rotation joint structure provides a two-stage locking mechanism.

According to the primary advantage of the present invention, the first limit member and the second limit member construct a two-stage locking mechanism, such that the movable joint is locked solidly and steadily and cannot be rotated, to ensure the safety of usage of the rotation joint structure.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
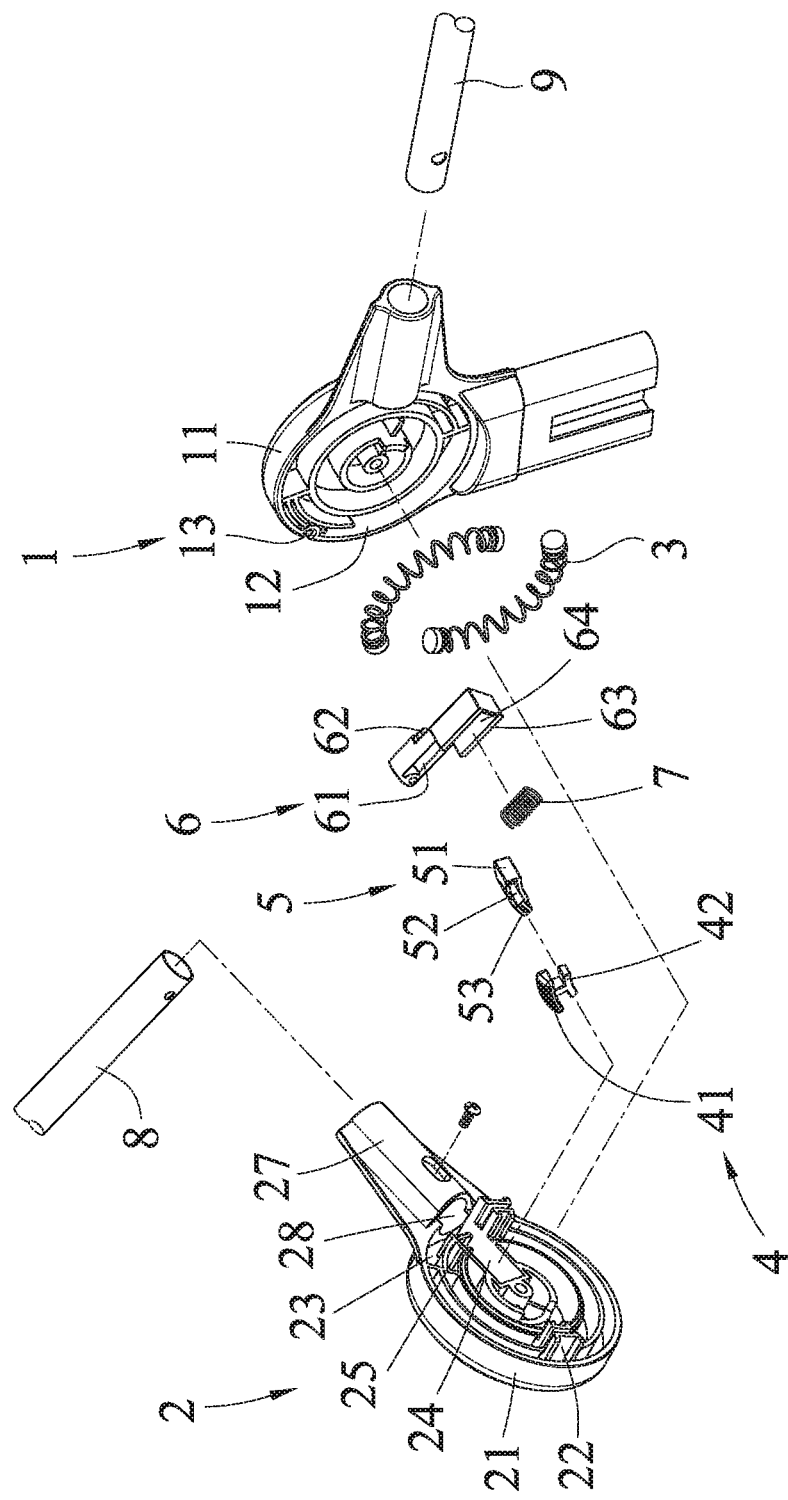
FIG. 1 is an exploded perspective view of a rotation joint structure in accordance with the preferred embodiment of the present invention.
Figure 2:
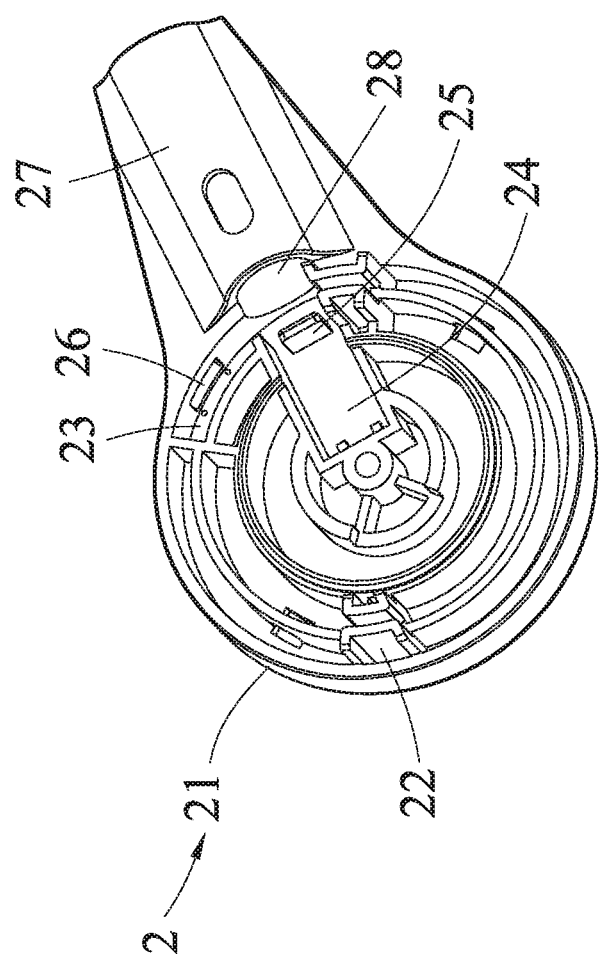
FIG. 2 is a perspective view of a movable joint of the rotation joint structure in accordance with the preferred embodiment of the present invention.

Referring to the drawings and initially to FIGS. 1-4, a rotation joint structure in accordance with the present invention comprises a fixed joint 1, a movable joint 2, at least one primary spring 3, a slide knob 4, a first limit member 5, a second limit member 6, a secondary spring 7, and a movable rod 8.

The fixed joint 1 has a fixed base 11. The fixed base 11 has a face provided with at least one primary receiving slot 12. The fixed base 11 has an outside provided with a locking groove 13.

The movable joint 2 has a movable seat 21. The movable seat 21 has a face formed with at least one resting portion 22, a first slideway 23, and a second slideway 24. The at least one resting portion 22 protrudes from the movable seat 21. The first slideway 23 is connected to the second slideway 24. The second slideway 24 has an interior formed with a protruding block 25. The movable seat 21 has an outside formed with an opening 26 and a mounting portion 27. The opening 26 penetrates the outside of the movable seat 21 and is connected to the first slideway 23. The mounting portion 27 extends outward from the outside of the movable seat 21 and defines a mounting recess 28. The mounting recess 28 linearly aligns with the second slideway 24 and is connected to the second slideway 24. The movable seat 21 is pivotally connected with the fixed base 11 such that the movable joint 2 is rotatable relative to the fixed joint 1. The at least one resting portion 22 extends into the at least one primary receiving slot 12. Thus, the at least one resting portion 22 limit the rotation angle of the movable joint 2. In addition, the movable joint 2 is rotatable to a position where the second slideway 24 and the mounting recess 28 correspond to the locking groove 13 simultaneously.

The at least one primary spring 3 is mounted in the at least one primary receiving slot 12 and has a first end pressing one end of the at least one primary receiving slot 12 and a second end pressing the at least one resting portion 22. Thus, when the at least one primary spring 3 is extended normally, the movable joint 2 is pressed by the at least one primary spring 3 such that the second slideway 24 corresponds to the locking groove 13 at a normal state.

The slide knob 4 has a knob body 41. The knob body 41 has a side formed with an insert 42. The slide knob 4 is mounted in the opening 26 such that the knob body 41 is exposed outward from the movable seat 21. The insert 42 extends through the opening 26 into the first slideway 23. Thus, the slide knob 4 is slidable in the opening 26.

The first limit member 5 has a first limit body 51. The first limit body 51 has a side formed with an insert slot 52. The first limit body 51 has an end formed with a stop block 53 protruding outward. The first limit member 5 is mounted in the first slideway 23. The insert 42 is inserted into the insert slot 52. Thus, the first limit member 5 is secured to the slide knob 4, such that the first limit member 5 is moved with the slide knob 4 to a position where the stop block 53 extends into the second slideway 24.

The second limit member 6 has a second limit body 61. The second limit body 61 has a first side formed with a locking block 62 protruding outward and a second side formed with a protruding wall 63 protruding outward. The protruding wall 63 defines a secondary receiving slot 64. The second limit member 6 is mounted in the second slideway 24 such that the locking block 62 is located outside of the second slideway 24, and the protruding wall 63 is received in the second slideway 24. Thus, the second limit member 6 is movable in the second slideway 24. When the movable joint 2 is rotated to a position where the mounting recess 28 corresponds to the locking groove 13, the locking block 62 is locked in the locking groove 13, such that the movable joint 2 is locked and cannot be rotated.

The secondary spring 7 is mounted in the secondary receiving slot 64. The secondary spring 7 has a first end pressing the protruding block 25 and a second end pressing one end of the secondary receiving slot 64.

The movable rod 8 is mounted in the mounting recess 28. The movable rod 8 has an end secured to the second limit body 61 of the second limit member 6. When the movable rod 8 is pulled, the movable rod 8 is moved in the mounting recess 28, and the second limit member 6 is driven and moved by the movable rod 8.

A fixed rod 9 is secured to the fixed base 11.

In the preferred embodiment of the present invention, the at least one primary receiving slot 12 has an arcuate shape.

In the preferred embodiment of the present invention, each of the insert 42 and the insert slot 52 has a T-shaped cross-sectional configuration.

In the preferred embodiment of the present invention, the protruding wall 63 has a U-shaped cross-sectional configuration.

In the preferred embodiment of the present invention, the fixed base 11 has a two primary receiving slots 12. The movable seat 21 has two pairs of resting portions 22. The rotation joint structure comprises two primary springs 3.

Again referring to FIGS. 1-4, the at least one primary receiving slot 12 of the fixed joint 1 has an arcuate shape and has a center of circle (or fulcrum) located at a pivot connection of the fixed joint 1. Thus, when the movable joint 2 is rotated, the at least one primary spring 3 is compressed. When the at least one primary spring 3 is released, the movable joint 2 is pushed by the at least one primary spring 3 and is rotated reversely.

Figure 8:
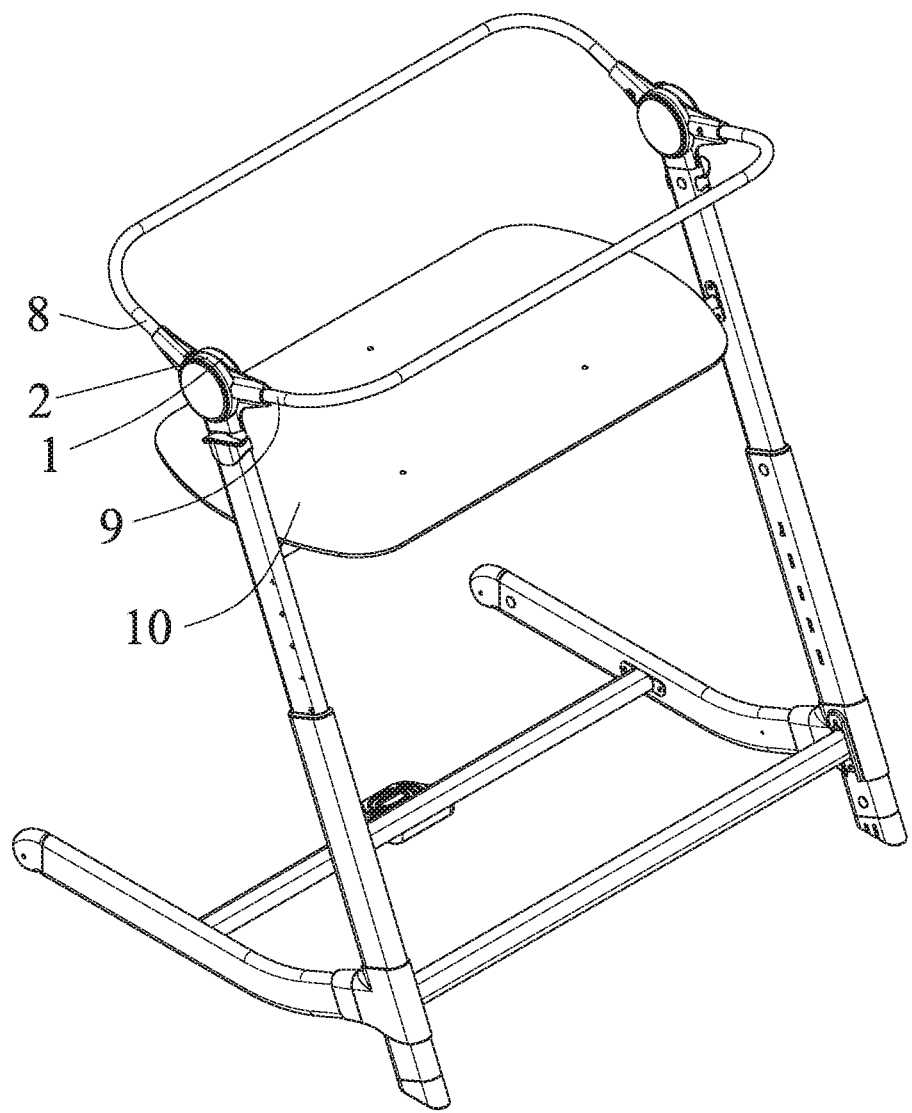
FIG. 8 is a perspective view showing that the rotation joint structure is available for a carrier.

Referring to FIG. 8 with reference to FIGS. 1-4, the fixed joint 1 is secured to a carrier 10, such as a baby bed, a play pen, a baby stroller, a coat rack or the like. The carrier 10 is provided with two rotation joint structures of the present invention. The two rotation joint structures are integrated with the movable rod 8, and are integrated with the fixed rod 9.

Figure 3:
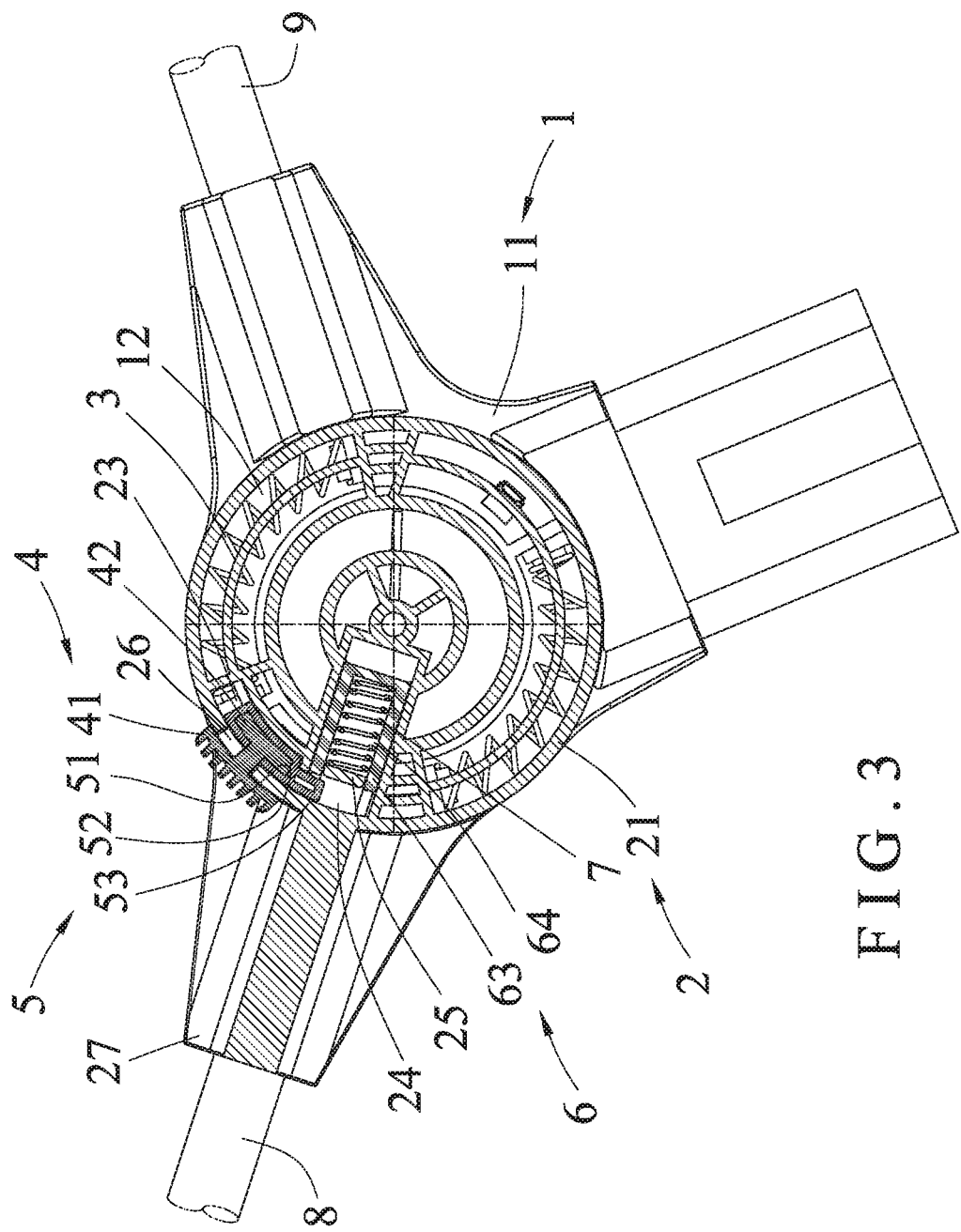
FIG. 3 is a cross-sectional view showing that the rotation joint structure is disposed at a locked state.
Figure 4:
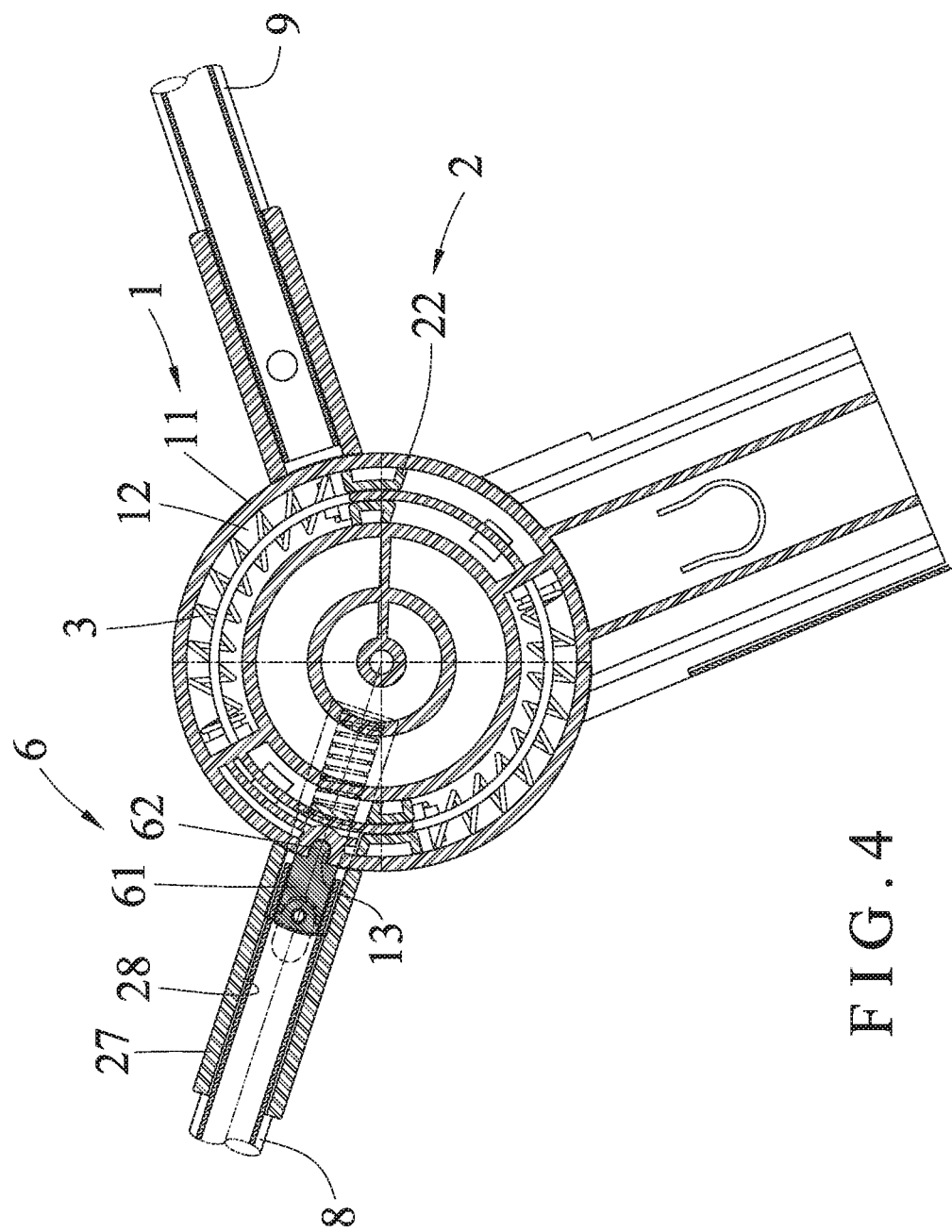
FIG. 4 is another cross-sectional view showing that the rotation joint structure is disposed at the locked state.

When the rotation joint structure is disposed at a locked state, the at least one primary spring 3 is extended normally, and the movable joint 2 is pressed by the at least one primary spring 3 such that the second slideway 24 corresponds to the locking groove 13 at a normal state. At this time, the secondary spring 7 is also extended normally to push the second limit member 6 such that the locking block 62 is locked in the locking groove 13 as shown in FIG. 4. Thus, the movable joint 2 is locked and cannot be rotated. In addition, the slide knob 4 is located at a position as shown in FIG. 3 where the stop block 53 of the first limit member 5 extends into the second slideway 24 and rests on the protruding wall 63 of the second limit member 6 to stop movement of the second limit member 6, such that the second limit member 6 is locked, and the movable rod 8 cannot be pulled outward, to prevent the locking block 62 from being unlocked and detached from the locking groove 13. Thus, the rotation joint structure provides a two-stage locking mechanism. Besides, the movable rod 8 is located at a higher position when the rotation joint structure is disposed at a locked state, such that the movable rod 8 and the fixed rod 9 are used to limit the baby in the carrier 10 which functions as a baby bed. Thus, the first limit member 5 and the second limit member 6 construct a two-stage locking mechanism, such that the movable joint 2 is locked steadily and cannot be rotated, to prevent the movable rod 8 from being unlocked and going down inadvertently, thereby preventing the baby from being clamped and hurt by the movable rod 8.

Figure 5:
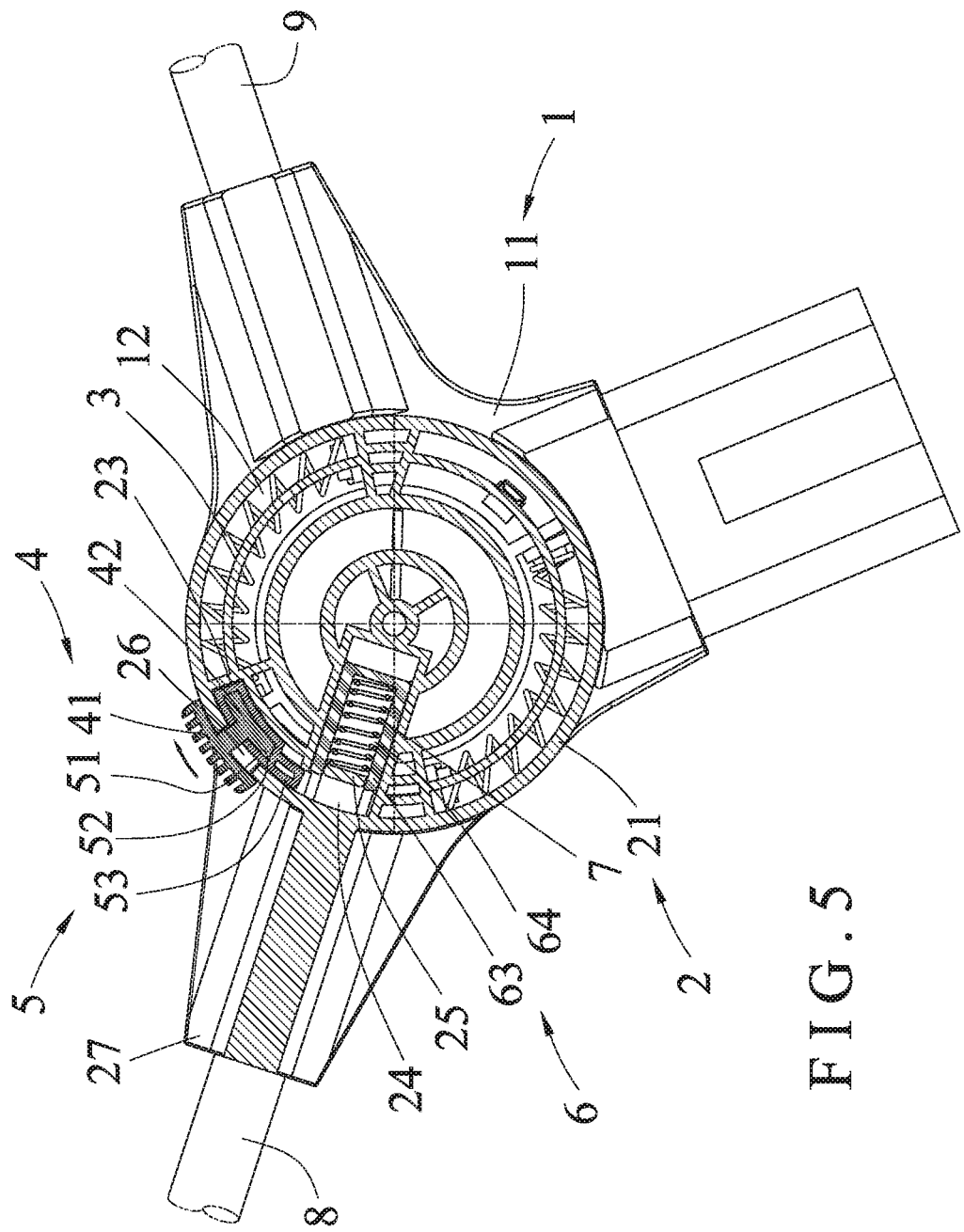
FIG. 5 is a cross-sectional view showing that the rotation joint structure is disposed at a first-stage unlocking state.
Figure 6:
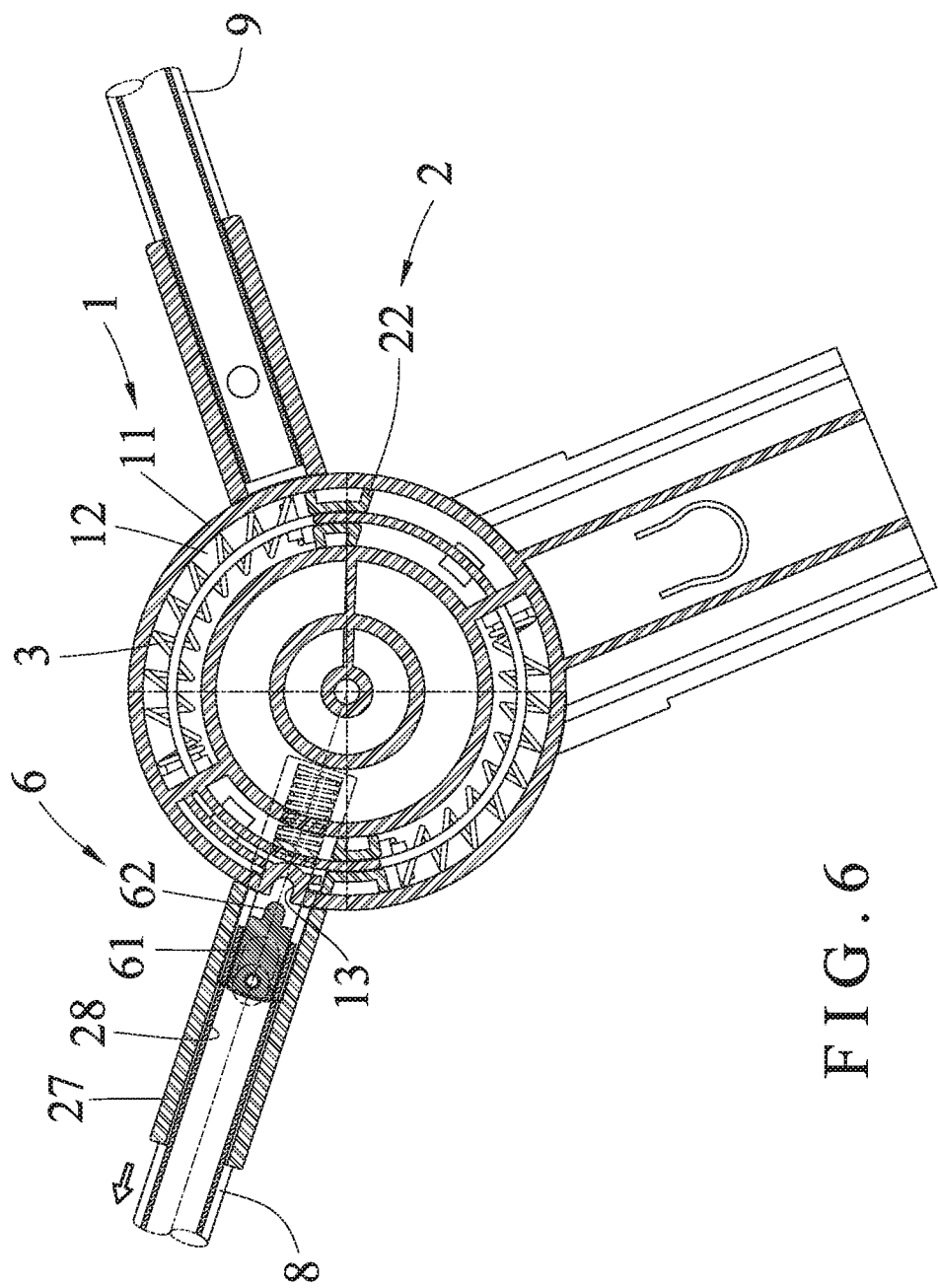
FIG. 6 is a cross-sectional view showing that the rotation joint structure is disposed at a second-stage unlocking state.
Figure 7:
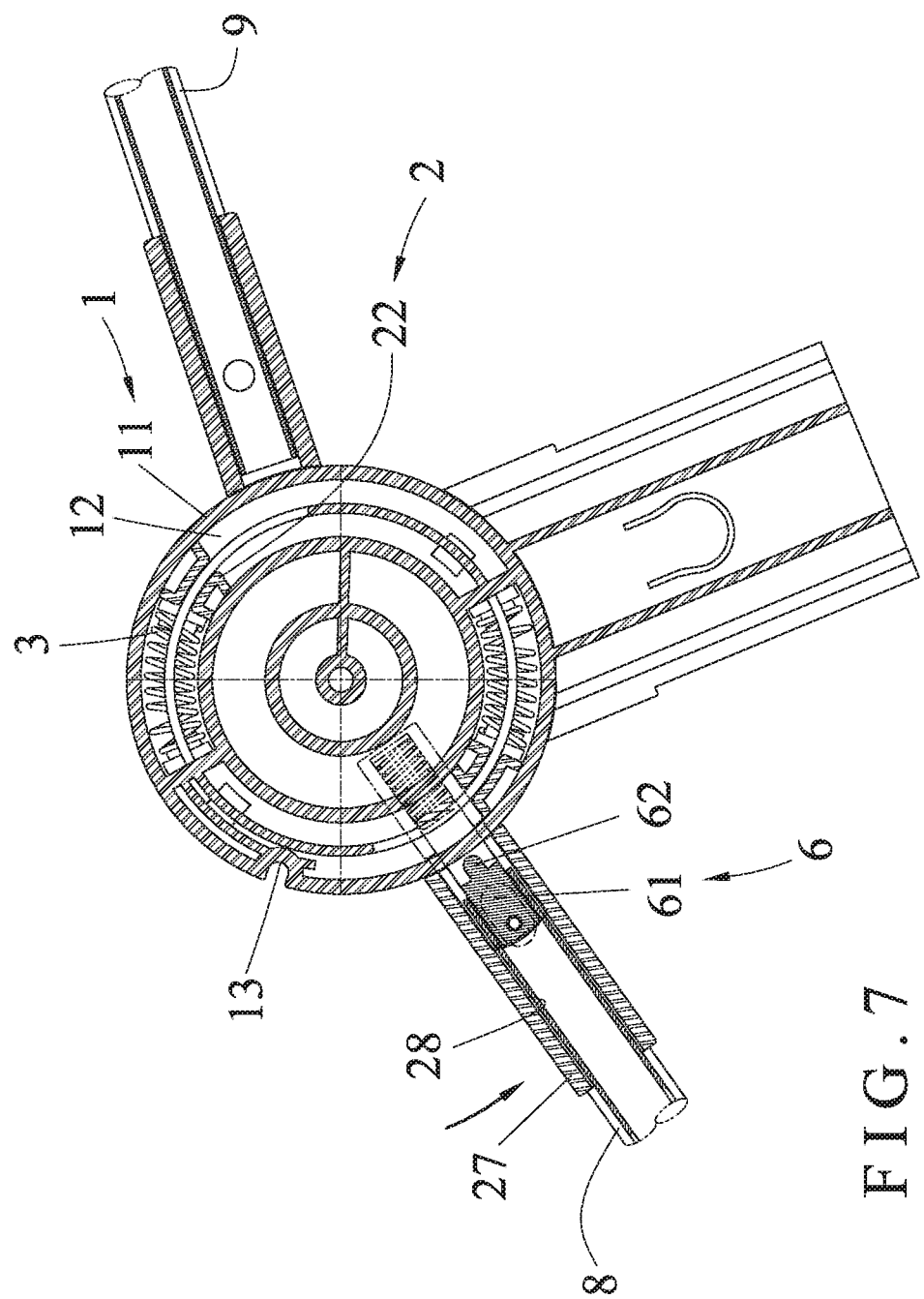
FIG. 7 is a cross-sectional view showing that the rotation joint structure is disposed at a unlocked and pivotable state.
Figure 9:
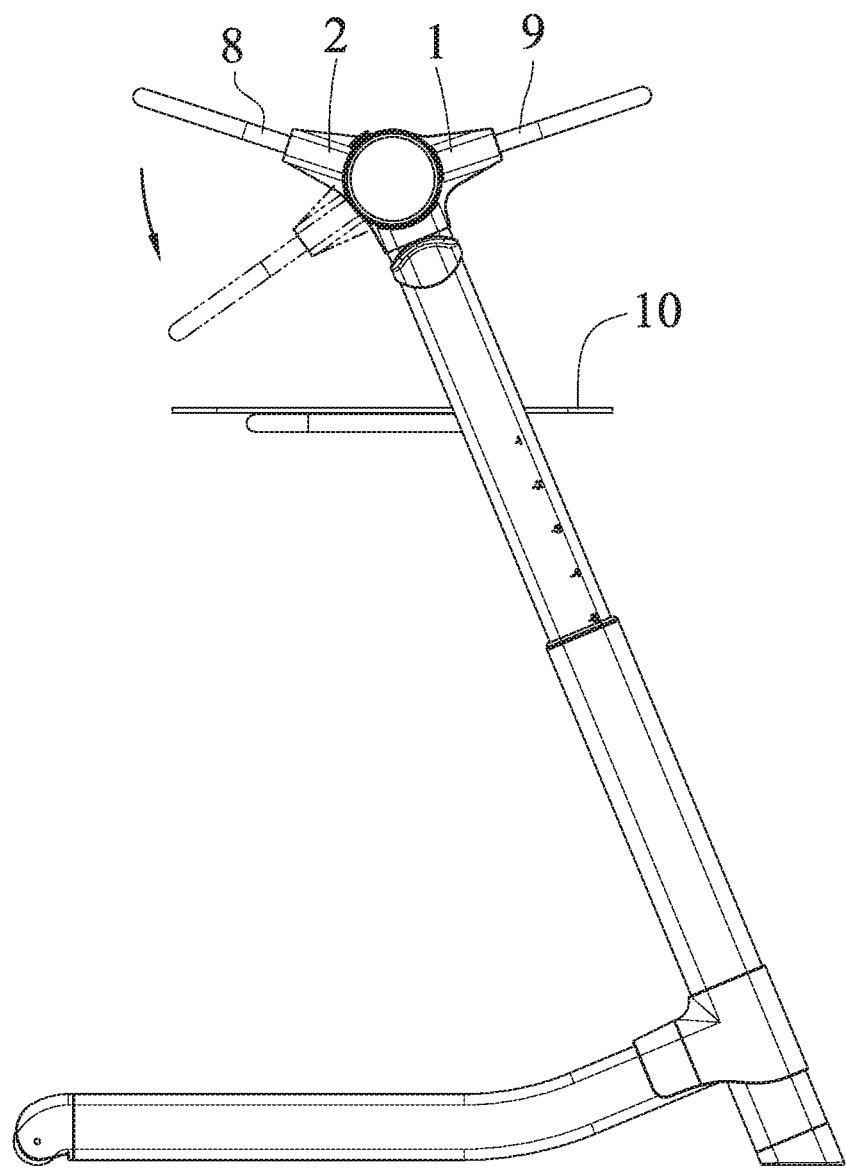
FIG. 9 is a schematic operational view of the rotation joint structure for the carrier as shown in FIG. 8 in use.

Referring to FIGS. 8 and 9 with reference to FIGS. 1-7, when the user wishes to unlock the movable joint 2, the slide knob 4 is moved to a position as shown in FIG. 5 where the stop block 53 of the first limit member 5 is detached from the second slideway 24 to release the protruding wall 63 of the second limit member 6 and to unlock the second limit member 6, such that the second limit member 6 is movable freely. Then, the movable rod 8 is pulled outward, such that the locking block 62 is unlocked and detached from the locking groove 13 as shown in FIG. 6. Thus, the two-stage locking mechanism is unlocked, such that the movable joint 2 can be rotated freely as shown in FIG. 7. In such a manner, when the movable rod 8 is pressed, the movable rod 8 is moved downward to a lower position as shown by phantom lines in FIG. 9, thereby facilitating the user taking care of the baby. After the movable rod 8 is released, the at least one primary spring 3 is released, and the movable joint 2 is pressed by the restoring force of the at least one primary spring 3, and is moved to a position where the second slideway 24 corresponds to the locking groove 13, and the locking block 62 corresponds to the locking groove 13. Then, when the secondary spring 7 is released, the second limit member 6 is pressed by the restoring force of the secondary spring 7, and the locking block 62 is moved into and locked in the locking groove 13. Thus, the movable joint 2 is locked and cannot be rotated.

Accordingly, the first limit member 5 and the second limit member 6 construct a two-stage locking mechanism, such that the movable joint 2 is locked solidly and steadily and cannot be rotated, to ensure the safety of usage of the rotation joint structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A rotation joint structure comprising:
a fixed joint, a movable joint, at least one primary spring, a slide knob, a first limit member, a second limit member, a secondary spring, and a movable rod;
wherein:
the fixed joint has a fixed base;
the fixed base has a face provided with at least one primary receiving slot;
the fixed base has an outside provided with a locking groove;
the movable joint has a movable seat;
the movable seat has a face formed with at least one resting portion, a first slideway, and a second slideway;
the at least one resting portion protrudes from the movable seat;
the first slideway is connected to the second slideway;
the second slideway has an interior formed with a protruding block;
the movable seat has an outside formed with an opening and a mounting portion;
the opening is connected to the first slideway;
the mounting portion extends outward from the outside of the movable seat and defines a mounting recess;
the mounting recess linearly aligns with the second slideway and is connected to the second slideway;
the movable seat is pivotally connected with the fixed base;
the at least one resting portion extends into the at least one primary receiving slot;
the at least one primary spring is mounted in the at least one primary receiving slot and has a first end pressing one end of the at least one primary receiving slot and a second end pressing the at least one resting portion;
the slide knob has a knob body;
the knob body has a side formed with an insert;
the slide knob is mounted in the opening such that the knob body is exposed outward from the movable seat;
the insert extends through the opening into the first slideway;
the first limit member has a first limit body;
the first limit body has a side formed with an insert slot;
the first limit body has an end formed with a stop block;
the first limit member is mounted in the first slideway;
the insert is inserted into the insert slot;
the second limit member has a second limit body;
the second limit body has a first side formed with a locking block and a second side formed with a protruding wall;
the protruding wall defines a secondary receiving slot;
the second limit member is mounted in the second slideway;
the locking block is located outside of the second slideway;
the protruding wall is received in the second slideway;
the secondary spring is mounted in the secondary receiving slot;
the secondary spring has a first end pressing the protruding block and a second end pressing one end of the secondary receiving slot;
the movable rod is mounted in the mounting recess; and
the movable rod has an end secured to the second limit body of the second limit member.

2. The rotation joint structure as claimed in claim 1, wherein the at least one primary receiving slot has an arcuate shape.

3. The rotation joint structure as claimed in claim 1, wherein each of the insert and the insert slot has a T-shaped cross-sectional configuration.

4. The rotation joint structure as claimed in claim 1, wherein the protruding wall has a U-shaped cross-sectional configuration.

* * * * *